June 21, 1966  R. W. HODGSON ETAL  3,256,605
RANDOM LOAD RECORD ANALYZER
Filed April 29, 1963  2 Sheets-Sheet 1
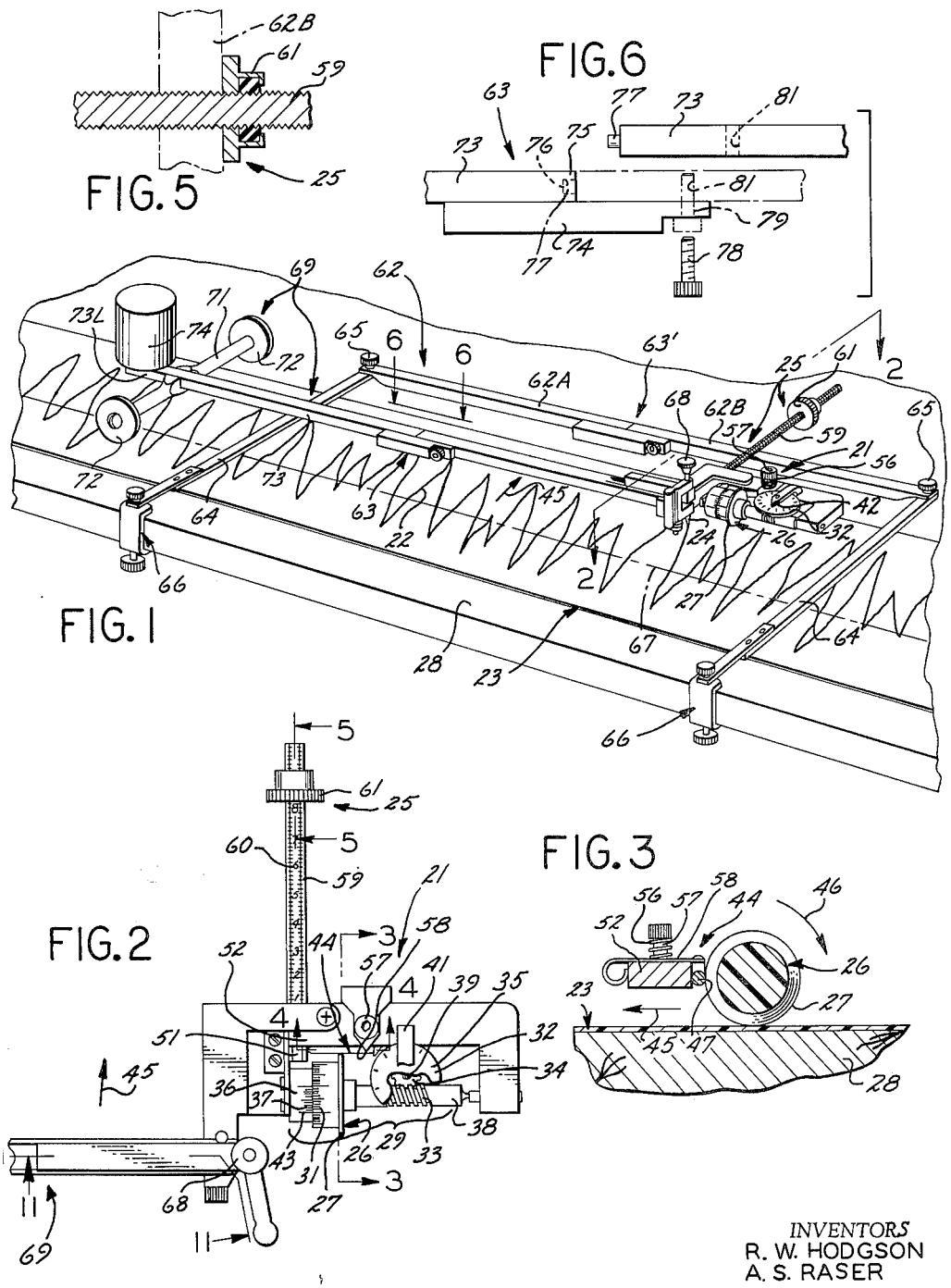
INVENTORS
R. W. HODGSON
A. S. RASER

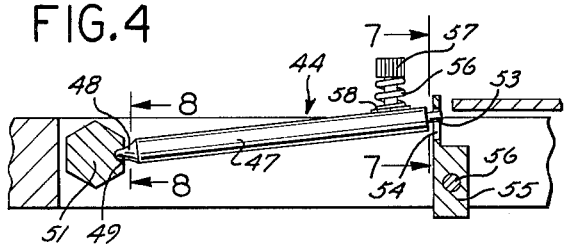
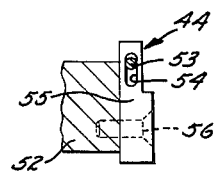
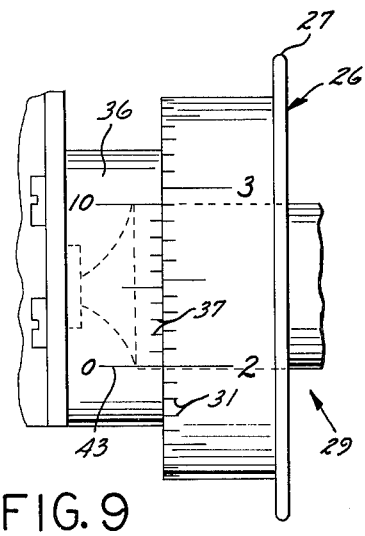
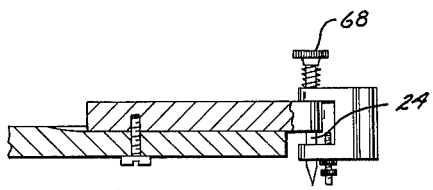
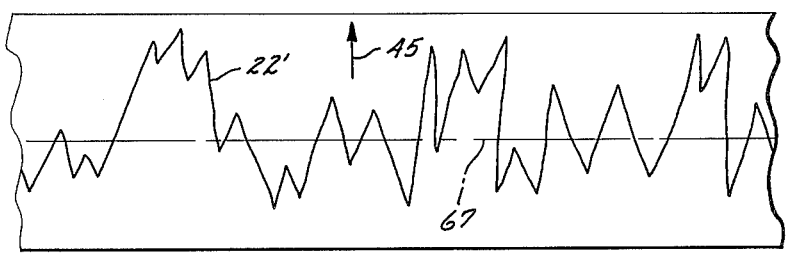
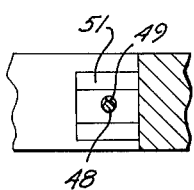
INVENTORS
R. W. HODGSON
A. S. RASER

United States Patent Office 3,256,605
Patented June 21, 1966

3,256,605
RANDOM LOAD RECORD ANALYZER
Robert W. Hodgson, 3406 W. Washington Blvd., Los Angeles 18, Calif., and Anne S. Raser, 6451 W. 83rd St., Los Angeles 45, Calif.
Filed Apr. 29, 1963, Ser. No. 276,453
12 Claims. (Cl. 33—1)

In its broadest sense the present invention relates to apparatus for unidirectionally measuring changes of a variable function in one direction, and in one exemplary, but non-specifically limiting, aspect of the invention may comprise a random load record analyzer and/or unidirectional distance measuring device which may be employed in a variety of ways and, in one particular form, may be employed for converting a variable function of random vibratory fatigue loading structure into a form which can be readily used in the prediction of fatigue life of the structure.

In connection with the above, it should be noted that one requirement for the easy prediction of fatigue life of a structure from a variable function corresponding to the vibratory stress or loading thereof is that all load or stress peaks of the variable are equal to one of a finite list of values. Also, no problem exists when the variable function corresponding to vibratory load or stress of the structure is sufficiently repetitive to permit use of harmonic analysis. However, the prior art has been in need of a general method which could treat random load and/or stress variations.

An effective combination of the M. A. Miner Theory of cumulative fatigue damage (see Journal of Applied Mechanics, 12 A 159, 1945) and the S. R. Valluri Theory of cumulative fatigue damage (see California Institute of Technology Report No. GALCIT 7024–70666, 1961), taken in conjunction with our extension thereof, and as applied by us, provides a rapid procedure for converting any kind of variable function which is a function of vibratory stress and/or loading of a structure into finite repetitions referred to above as being capable of use for easy prediction of fatigue life of the structure.

In connection with the above, it should be noted that the above-mentioned theories can express cumulative fatigue damage to a structure in terms of certain summations or integrals. When a random, or nearly random, loading or stress variable function, or record setting forth said variable function, is given and a fatigue life prediction is sought, these integrals would have to be evaluated. Since these are integrals of a frequency distribution spectrum rather than of any areas which can be directly associated with the given function of time, their evaluation does not lend itself to simple graphical procedures.

Furthermore, Miner's Theory states that each cycle of stress makes a non-negative contribution to the fatigue damage leading to failure of the structure and that this contribution is not affected by its position in the sequence of cycles. It is affected or determined only by the maximum values of stress within the cycle; therefore, any two cycles having the same extreme values will contribute twice the fatigue damage of one cycle alone.

It is readily apparent that the literal application of Miner's Theory to a very repetitive vibratory loading and stress record is relatively easy, but that the literal application of Miner's Theory to the random stress problem would be prohibitively tedious, time-consuming, and expensive as a method for predicting fatigue life of a structure.

Valluri's Theory establishes a reference stress to which the damage of every stress cycle is referred; from this stress and from the stress range (maximum minus minimum), the contribution of the cycle can be found. Therefore, Valluri's Theory is somewhat more suitable for use in predicting maximum fatigue life of a structure which is subjected to random vibratory loading.

It can be shown that the conversion of a variable function or record corresponding to the random vibratory loading and/or stress curve of a structure into a form which can be easily used in the prediction of fatigue life of a structure (by converting it into an equivalent set of constant amplitude patterns) can be done using closed integrals which are readily evaluated.

For example, apparatus can be provided for effectively measuring the integral of the variable which is a function of random vibratory loading or stress of a structure in accordance with the following definition thereof:

$$I = \oint u v \, ds$$

where I comprises said integral, where $u$ is unity when $s$ is increasing with time where $v$ is unity when $s$ is greater than R, and where each of $u$ and $v$ is zero otherwise. In this connection, it should be noted that R is an independent variable which effectively comprises a limit value (of the variable, $s$) which is arbitrarily selected and which is repetitively changed in order to provide a plurality of different evaluations for the integral I in the above-mentioned equation so that in new curve of I versus R can be plotted for subsequent use in the relatively easy prediction of maximum fatigue life of the structure subjected to random vibratory loading and being analyzed by the technique referred to briefly and in part only herein. The range of possible values of R is the same as $s$, which is the actual value of the variable vibratory random stress or loading function of the structure. The integration symbol used in the above equation denotes integration around a closed path which, in this case, represents a range of time values from zero to T. This is intended to indicate the time interval of the given loading. Within this interval, each and every stress change in one direction does or does not contribute to the closed integral depending upon the assigned value of R, and stress changes in the opposite direction do not contribute to the closed integral in any manner whatsoever.

It is believed to be unnecessary and, indeed, undesirable in this present application to detail the complete modified composite Theory indicated above for the conversion of a variable which is a function of random vibratory stress and/or loading of the structure into a form capable of ready use for prediction of fatigue life of the structure, in accordance with the principles referred to briefly and in part only hereinbefore.

It is believed to be sufficient to point out that the provision of apparatus for determining the value of the above-mentioned integral comprises the first and basic step in following the technique referred to above for converting a random vibratory stress and/or loading variable function into a tractable form which can be used for the prediction of maximum fatigue life of the structure with a minimum of time-consuming labor.

Therefore, the apparatus of the present invention, as defined hereinafter, comprises one such form of apparatus capable of measuring an integral such that the relationship between this integral and stress or loading and the known properties of the material provide all of the information required for predicting the number of times that the stress would be expected to deflect the pattern described by the record before the structure fails due to fatigue.

In the specific form of the apparatus of the present invention illustrated in the drawings and described in detail hereinafter, it taking a form wherein the random vibratory stress and/or loading variable function of a structure is initially in the form of a graphical record comprising a graph or chart bearing a curve expressing values of the function in terms of position relative to a Cartesian coordinate reference frame (not shown, since such are well known in the art) with the ordinate direction thereof corresponding to the value of the function and with abcissa direction corresponding to the independent variable time. In this specific form of the apparatus of the present invention, it comprises apparatus for actually measuring the value of the above-defined integral in a way which adds to the measurement whenever the curve of the variable moves in one direction and is beyond the arbitrary value R and does not add any measurements to the integral when the curve moves in the opposite direction.

In other words, the specific form of the invention illustrated in the figures and described in detail hereinafter comprises an apparatus for graphically integrating along a closed path (or its equivalent) by operating the apparatus in a curve-tracing or curve-following manner and with the apparatus actually summing up and totalizing the numerical value of the resulting closed integral which can then be used repetitively with different values of R being assigned to the apparatus and, therefore, with different values of I, for subsequent conversion and analysis for the ready prediction of maximum fatigue life of a structure in the manner referred to above.

With the above points in mind, it is an object of the present invention to provide apparatus for unidirectionally integrating changes in one direction of a variable function when in excess of a preselected limit value or, more generally, when these changes have been multiplied by some factor which bears a preselected relationship to the instantaneous value of the above-mentioned variable function.

It is a further object of the present invention to provide apparatus of the character referred to in the preceding object, adapted for use in a primary conversion step for converting a random vibratory variable stress and/or loading function into a constant amplitude pattern, closed integral form for convenient use in predicting the maximum fatigue life of a structure subject to said random vibratory loading.

It is a further object of the present invention to provide apparatus for unidirectionally integrating physical displacements of a graphical record of a variable function when in excess of a predetermined controllably adjustable limit value thereof, with respect to a Cartesian coordinate frame of reference.

It is a further object of the present invention to provide apparatus of the character referred to in the preceding object, adapted for use in a primary conversion step for converting a random vibratory graphical stress and/or loading function record in the form of a curve into a constant amplitude pattern form for convenient use in predicting the maximum fatigue life of a structure subject to said random vibratory loading.

It is a further object of the present invention to provide novel apparatus of the character referred to above, in any or all of the various generic and/or specific aspects mentioned above, either individually or in any possible combination thereof.

It is a further object of the present invention to provide apparatus of the character referred to hereinbefore which is of relatively simple, inexpensive, rugged, easy-to-manufacture, easy-to-use construction, and which is adapted for very simple, quick and easy use in following a graphical record in the form of a curve corresponding to random vibratory loading of a structure whereby to greatly simplify the task of predicting the maximum fatigue life of the structure under such random vibratory loading.

Further objects are implicit in the detailed description which follows hereinafter (which is to be considered as exemplary of one form of the invention but not specifically limiting it thereto) and said objects will be apparent to persons skilled in the art after a careful study of the detailed description which follows hereinafter.

For the purpose of clarifying the nature of the present invention, one exemplary, but non-specifically-limiting, embodiment of the invention is illustrated in the herein-below described figures of the accompanying two sheets of drawings.

FIG. 1 is a perspective view illustrating one exemplary, and non-specifically-limiting, embodiment of the invention in operative position with respect to a drawing board, table, or the like, which has positioned and clamped thereon a portion of a graphical record of an oscillating curve corresponding to the random vibratory loading of a structure and which is to be effectively converted, insofar as a major primary step is concerned, by the apparatus of the present invention into a form readily adapted for use in predicting the maximum fatigue life of the random vibratory loaded structure. In other words, this view shows one form of the invention in actual operative use with respect to a graphical random vibratory loading record of a structure.

FIG. 2 is a larger scale, fragmentary, top plan view (with certain portions broken away for reasons of drawing clarity) of the curve-following apparatus and the effective conversion means for converting curve changes in one direction, and when in excess of an arbitrary and controllably adjustably selected limit value, into an effective output (comprising the visibly observable scale and indicia means) corresponding to the value of the closed integral referred to hereinbefore. This view also shows the direction-of-change inactivating means for preventing an output in response to movement of the stylus or curve-follower in the opposite direction from that which produces output and also shows the limit-value-inactivating means which effectively acts to prevent output except when in excess of a controllably adjustable predetermined limit value. Generally speaking, it can be said that this view is taken in the direction of the arrows 2—2 of FIG. 1 and shows the apparatus immediately underlying said arrows with the exception of the chart or graph, the table underlying same, and the controllably adjustable fence means and clamp means carrying same and effectively clamping the record or chart to the drafting board surface. All of these elements have been removed from FIG. 2. The longitudinal tongue member carrying said apparatus is shown broken away at the left side of FIG. 2 and a portion of the counting and totalizing means of the apparatus is also shown broken away in order to show the drive coupling which is in effective driving relationship with respect thereto, it, of course, being understood that both of these elements are actually in the complete, rather than the broken away, form in the real apparatus as is clearly shown in FIG. 1.

FIG. 3 is a larger scale fragmentary view, with certain portions of the apparatus removed for reasons of drawing simplification, taken in the direction of the arrows 3—3 of FIG. 2. This view primarily illustrates the relationship of the direction-of-change inactivating means with respect to the rollable wheel means of the conversion means and which is adapted to engage the surface of the chart as the stylus follows the curve of the chart or graph and which is allowed to roll in one direction by said direction-of-change inactivating means but which is prevented thereby from rolling in the opposite direction.

FIG. 4 is a greatly enlarged fragmentary view, with certain parts removed for reasons of drawing simplification and clarity, taken in the direction of the arrows 4—4 of FIG. 2, and primarily shows the above-mentioned direction-of-change inactivating means which is cooperable with the rollable wheel means in the manner shown in FIG. 3.

FIG. 5 is an enlarged fragmentary sectional view taken in the direction of the arrows 5—5 of FIG. 2 and clearly illustrates a portion of the hereinbefore-mentioned limit-value-inactivating means. A portion of the fence means, clearly shown in solid lines in FIG. 1, is also shown (in phantom, however) in FIG. 5 in stopping or abutting relationship relative to the remainder of said limit-value-inactivating means, thus clearly indicating the cooperative relationship of said limit-value-inactivating means when the arbitrary and controllably adjustable limit value on the curve being followed by the stylus shown in FIG. 1 is reached.

FIG. 6 is an enlarged fragmentary exploded top plan view clearly showing the controllably engageable rigid connection or coupling, underlying the arrows 6—6 of FIG. 1 and adapted to controllably and rigidly longitudinally fasten the two portions (comprising left and right portions, as shown in FIG. 1) of the longitudinal tongue means of the complete longitudinal carriage carrying the movable portion of the apparatus shown in FIG. 1. However, it should also be noted that a similar controllably engageable rigid longitudinal fastening or coupling means is also provided at the center of the fence means shown in FIG. 1, and FIG. 6 is exemplary of the structure thereof also. Furthermore, it should be noted that the right hand portion of the coupling or fastening is shown, in full or solid lines, exploded away from the remainder thereof as is the fastening screw. However, the assembled position of the complete coupling or fastening is shown with said right hand portion thereof and said fastening screw thereof illustrated in phantom in FIG. 6.

FIG. 7 is a fragmentary view, partly in elevation and partly in section, taken in the direction of the arrows 7—7 of FIG. 4 and illustrates the vertically slidable mounting of the right end of the direction-of-change inactivating means which allows it to lock and prevent rotation of the rollable wheel means, as best shown in FIG. 3, in one direction of rotation and yet which freely allows oppositely directed rotation thereof.

FIG. 8 is a fragmentary view, partly in elevation and partly in section, showing the pivotal mounting of the other end of the direction-of-change inactivating means shown in detail in FIGS. 3, 4, and 7.

FIG. 9 is an enlarged fragmentary top plan view of the rollable wheel means as seen from the same viewpoint as FIG. 2, although the scale of the drawing is greatly enlarged with respect to that shown in FIG. 2. This view clearly illustrates a portion of the counting and totalizing means operated by the rollable wheel means, the remainder thereof being shown in enlarged top plan view in FIG. 10.

FIG. 10 is an enlarged fragmentary top plan view of the remaining portion of said counting and totalizing means as seen from a viewpoint similar to that of FIG. 2, although the scale of this drawing is greatly enlarged with respect to FIG. 2.

FIG. 11 is an enlarged fregmentary view, partly in section and partly in elevation, taken in the direction of the arrows 11—11 of FIG. 2 and clearly shows the curve-following or tracing sytlus means which is adapted to follow and trace the curve of the chart or graph in the manner best shown in FIG. 1.

FIG. 12 is a fragmentary top plan view of a section of a typical chart or graph bearing a typical random vibratory loading curve which is of a type especially suited to be converted, through the use of the apparatus of the present invention, into output data which can be subsequently employed for the purpose of predicting maximum fatigue life of a structure subjected to such random vibratory loading.

Generally speaking, the apparatus of the present invention is shown in the figures in one exemplary curve-tracing form for producing an output corresponding to the hereinbefore-mentioned closed integral, wherein it comprises conversion means, generally indicated at 21, adapted for use in following changes of a variable function and for producing output corresponding to the hereinbefore-mentioned closed integral function of the actual point-to-point value of said variable function.

In the exemplary, but non-specifically-limiting form of the invention illustrated in the figures, the variable function referred to above comprises a record in the form of a curve 22 carried by a chart or graph indicated generally at 23; said curve 22 being a record of the random vibratory loading of a structure.

Also, in the exemplary, but non-specifically-limiting form of the invention illustrated, the above-mentioned following of changes of said variable function takes the form of physically following displacements of the curve 22 and producing a readable output therefrom which corresponds to the hereinbefore-mentioned closed integral. However, at this point, it should be clearly noted that the invention is not specifically limited to curve tracing and/or to conversion of physical displacements into said readable output—this merely being the exemplary form of the invention illustrated in the figures, which is one of many possible forms of the broad invention. Actually, any analog of the random vibratory loading of a structure (or any equivalent analog type of signal or the like) which may be in the form of an electrical signal or any other perceptible signal and/or record, may have changes thereof effectively followed by the conversion means whereby to produce an output (which may be either a digital output or an analog output) corresponding to the hereinbefore-mentioned closed integral function thereof.

In the exemplary, but non-specifically limiting, form as allowed by the limit-value inactivating means, indicated generally at 21, comprises stylus means 24 which is adapted to be used in following the curve 22 insofar as allowed by the limit-valve inactivating means, indicated generally at 25, which will be described in detail hereinafter.

Also, in the exemplary but non-specifically-limiting form of the invention illustrated, said conversion means 21 further comprises the rollable wheel means 26 which has a circumferential frictional outer edge surface 27 adapted to make frictional rolling contact with either the top surface of the graph or chart 23 or the top surface of the drawing board, or the like, shown fragmentarily at 28 in FIG. 1.

Also, in the exemplary but non-specifically-limiting form of the invention illustrated in the figures, said conversion means 21 further includes counting and totalizing means effectively coupled with respect to said rollable wheel means 26 and adapted to count and totalize the actual perpendicular distance in one direction of movement (as modified by the limit-value inactivating means 25, which will be described hereinafter) of said stylus means 24 along the curve 22.

In the exemplary form illustrated, the above-mentioned counting and totalizing means includes the several elements generally designated by the reference numeral 29 (best shown in FIG. 2) and effectively comprising the hereinbefore-mentioned rollable wheel means 26, the scale (and indicia) means 31 carried thereby, which corresponds to numbers which are multiplied by ten-to-the-zero power, the wheel or disc 32 effectively coupled by the worm 33 and the worm gear or wheel 34 which effectively, together, comprise a one-to-ten reduction gearing, driven by the rollable wheel means 26, the scale (and indicia) means 35 carried by said disc 32, which corresponds to numbers which are multiplied by ten-to-the-one power. Said counting and totalizing means 29 also includes the fixed Vernier membed 36 which bears the scale (and indicia) means 37 which correspond to numbers multiplied by ten-to-the-minus-one power.

The worm gear 33 is carried by the rotary axle 38 which is pivotally mounted at each end. Also, it should be noted that the disc 32 is pivotally mounted by an effective center post 39 carried by the bracket member 41.

Thus, it will be readily seen that, except for the two different types of inactivating means which will be described hereinafter, the conversion means 21 and the counting and totalizing means 29 thereof would effectively act to produce readable output information or data (which can be read on the scale and indicia means 35, 31, and 36, as three significant figures) corresponding to the actual movement of the stylus 24 along the curve 22. The actual reading of one digit is normally done by using the reference pointer 42 as a marker to determine what point on the scale (and indicia means) 35 is to be read, while the lower line 43 of the Vernier scale (and indicia) means 36 is normally used as the reference point for reading the scale (and indicia) means 31. The scale (and indicia) means 36 is read in the usual manner of Vernier scales by finding which scale markings of the scale 36 and the scale 31 are lined up and then reading the numerical value of the Vernier scale (and indicia) 36 of said lined up scale markings.

The value read on the scale 35 corresponds to a number position displaced two places to the left of a decimal point, while the value read on the scale 31 corresponds to a number displaced one place to the left of a decimal point, and the value read on the scale means 36 corresponds to a number displaced one place to the right of a decimal point.

It should be clearly understood that the scale, indicia, and number-reading structures and arrangements just described can be modified widely within the basic spirit and scope of the present invention.

The conversion means 21 and the counting and totalizing means 29 thereof are limited to operation in one direction of change or of displacement of the curve 22, and of the stylus 24 following same, by direction-of-change inactivating means, indicated generally at 44, as best shown fragmentrily in FIGS. 3, 4, and 7. Said direction-of-change inactivating means 44 is cooperable with respect to the previously described conversion means 21 to effectively inactivate same, insofar as the production of an output (in the specific form illustrated, the readable output provided by the scale (and indicia) means 35, 31 and 36) whenever the stylus means 24 follows the curve 22 in one direction opposite to the selected direction for the production of said output.

In the exemplary, but non-specifically-limiting form of the invention illustrated, said direction-of-change inactivating means 44 may be said to comprise effective one-way movement overriding means, also designated by the reference numeral 44, effectively connected or cooperable with respect to the previously described rollable wheel means 26 of the counting and totalizing means 29 of the conversion means 21 for effectively overriding the counting and totalizing operation described hereinbefore during movement of the stylus means 24 along the curve 22 in a direction which has been selected as a non-output-signal-producing direction.

In the specific form of the invention illustrated in the figures said non-output-signal-producing direction is the direction generally designated by the arrow 45 shown in FIGS. 1, 2, 3, and 12. However, said effective one-way movement overriding means 44 is arranged to be wholly ineffective and inoperable and to not in any way interfere with the previously described counting and totalizing operation of the conversion means 21, and the counting and totalizing means 29 thereof, when the rollable wheel means 26 rolls along the chart or graph 23 in a direction opposite to the arrow 45. The allowed rotary motion of said rollable wheel means 26 is designated by the curved arrow 46 in FIG. 3.

In the exemplary but non-specifically-limiting form of the invention illustrated, the above-described overriding means 44 effectively comprises frictional brake means 47 positioned adjacent to the frictional exterior 27 of the rollable wheel means 26 and cooperable therewith in a manner allowing free rotation of said rollable wheel means 26 as indicated by the arrow 46 in FIG. 3 when the stylus means 24 is moving in the output-signal-producing direction of movement directly opposite to the arrow 45, and frictionally lockably cooperable therewith for effective braking and stopping of said rollable wheel means 26 in response to movement of said stylus means 24 in the opposite and non-output signal-producing direction of movement thereof along the curve 22 as indicated by the directional arrow 45.

In the exemplary but non-specifically limiting form illustrated, said frictional brake means 46 effectively comprises a cylindrical member, which may comprise a standard needle bearing or any other equivalent structure, having one end 48 pivotally mounted in a receiving aperture 49 in a member 51 attached to the frame member 52, and having its opposite end 53 vertically slidably mounted in a slot 54 in a bracket member 55 fastened by suitable fastening means 56 to a portion of the base member 52 laterally spaced from the member 51 pivotally carrying the other end 49 of said needle bearing 47.

Biasing spring means 56 is mounted on a screw 57 fastened to the top surface of the base member 52 and exerts downward force on a finger member 58 which presses against the top surface of the right hand end (as seen in FIGS. 1, 2, and 4) of the needle bearing brake member 47 whereby to normally tend to force same downwardly against the frictional periphery 27 of the rollable wheel means 26 in the manner best shown in FIG. 3.

It will readily be understood that whenever the rollable wheel means 26 is rotated in the allowable direction indicated by the arrow 46 during the output-producing operation of the conversion means 21, the spring-biased end of the roller bearing braking means 47 will merely be deflected upwardly by the frictional exterior 27 of the rotating wheel means 26 against the downwardly spring-biased force exerted by the member 58. However, just as soon as the rollable wheel means 26 begins to attempt to roll in the opposite direction from that indicated by the arrow 46 in FIG. 3, which is the non-allowed and non-output-signal-producing direction, the frictional exterior 27 of the rollable wheel means 26 will tend to aid the action of the spring-biased member 58 in forcing the free end of said roller bearing breaking means 47 downwardly, as viewed in FIG. 3, into a position where it becomes effectively jammed between the laterally adjacent portions of the frictional exterior 27 of the rollable wheel means 26 and the base member 52 as is best shown in FIG. 3.

The above-described braking action effectively prevents such oppositely directed rotation of the rollable wheel means 26 and, therefore effectively inactivates the entire conversion means 21, and the counting and totalizing means 29 thereof, whereby to add nothing to whatever measured output is already visibly indicated by the scale and indicia means 35, 31, and 36, until such time as the stylus means 24 is again moved in the opposite direction whereby to bring about the permitted rotation of the rollable wheel means 26, as indicated by the directional arrow 46 in FIG. 3, when the entire conversion means 21, and counting and totalizing means 29 thereof, again become operative.

The previously mentioned limit-value inactivating means, indicated generally at 25, is effectively cooperable with respect to the conversion means 21 for effectively inactivating same (and also the counting and totalizing means 29 thereof) insofar as the production of any output is concerned when the stylus means 24 attempts to follow the curve 22 in the hereinbefore-mentioned output-signal direction with respect to the chart or graph 23 (which is directly opposite to the directional arrow 45) below a predetermined controllably adjustable limit value of said curve 22.

In the exemplary but non-specifically-limiting form of the invention illustrated, said limit-value inactivating means 25 comprises controllably adjustable stop or abutment means comprising the exteriorly threaded extension member 59 controllably threadedly adjustably carrying the interiorly threaded locknut 61 thereon, which can be controllably adjusted into any desired position, which can be readily determined by viewing the scale and indicia means 60 carried by the flatted top surface of the threaded member 59. Because of the fact that the nut 61 is a locknut, it will, of course, remain in any adjusted position irrespective of movement, vibration, and the like.

Said limit-value inactivating means 25 also comprises controllably adjustable fence means indicated generally at 62 and two fence portions 62A and 62B, centrally joined together by the readily disengageable rigid fastening and coupling means indicated generally at 63'. Opposite ends of the joined fence member consisting of the two portions 62A and 62B are provided with connection member means 64 and pivotal and controllably lockable connection means 65 connecting same thereto and said connection member means 64 are provided at opposite ends thereof with connection clamp means, indicated generally at 66, cooperable for rigid attachment with respect to corresponding edge portions of the underlying drafting board or supporting panel 28 carrying the chart 23 thereon.

It should be clearly noted that the arrangement is such that each of the connection member means 64 lies directly on top of laterally displaced portions of the chart 23 and acts to effectively position and clamp said chart or graph 23 on the top surface of the drafting board or table 28 so that the stylus 24 can be moved in a manner tracing the curve 22 without causing displacement or movement of the chart 23. The purpose of the rigid fastening and coupling means 63 will be described hereinafter.

It will readily be understood that the arrangement of the limit-value inactivating means 25, as is clearly shown in FIG. 1, is such that movement of the stylus means 24 in the output-signal-producing direction (which is directly opposite to the directional arrow 45) is possible and will produce readable output on the scale and indicia means 35, 31, and 36, until such time as the abutment or stop means comprising the locknut 61 strikes the outside of the fence member portion 62B as is clearly shown in FIG. 5. When this occurs, the stylus will have reached the limit line shown in phantom at 67 in FIGS. 1 and 12 and the stylus 24 can move no further along the curve 22, thus preventing any further output from being produced by the conversion means 21, and the counting and totalizing means 29 thereof, until such time as the stylus 24 is displaced in the direction of the arrow 45 away from said limit reference line 67 and is again moved back toward said limit line 67.

Thus, in practice, a user of the apparatus will normally cause the stylus 24 to follow the curve 22 in the direction of the arrow 45 to each peak of said curve 22 and then back down the far side of each peak in a direction opposite to the arrow 45 (which is the output-producing direction of movement) until the limit line 67 is reached, at which point the operator will merely move the stylus 24 transversely or toward the right along said limit line 67 until he reaches the next rightwardly adjacent portion of the curve 22, at which point he will again begin to follow the curve upwardly or in the non-output-direction of movement of the stylus 24 as designated by the arrow 45. This continues until the entire portion of the curve 22 lying above the limit line 67 has been effectively traced and the value shown on the scale and indicia means 35, 31, and 36 corresponds to the value of the hereinbefore-mentioned closed integral which can be used for facilitaing the quick and easy prediction of maximum fatique life of a structure subjected to random vibratory loading corresponding to the curve 22 shown in FIG. 1 or to the curve 22' shown in FIG. 12, or any other equivalent curve.

In the exemplary, but non-specifically-limiting, form of the invention illustrated in the figures, the conversion means 21, including the counting and totalizing means 29, and the two different previously described inactivating means, indicated at 25 and 44, are provided with support means for controllably movably mounting same in a manner which allows the stylus means 24 to controllably follow, track, or trace the curve 22 as allowed by the limit-value inactivting means 25 and the direction-of-change inactivating means 44 under the control of an operator digitally grasping and controlling the operating knob 68.

In the exemplary but non-specifically-limiting form of the invention illustrated, the above-mentioned support means is indicated generally at 69 and, in effect, comprises a longitudinal carriage means provided with axle means 71 and spaced wheel means 72 carried by said axle means 71, with said axle means 71 normally being rollably supported by said wheel means 72 on the board or surface 28 and/or the chart 23 carried thereon in a manner such that said axle means 72 lies in a position substantially parallel to the ordinate direction of a Cartesian coordinate frame of reference if such were placed in a normal relationship relative to the chart 23 so that the abcissa direction would extend toward the right parallel to the limit value line 67. This positioning of the axle 71 and the wheels 72 provides for ready movement of the entire support means or longitudinal carriage 69 in the abcissa direction—that is, toward the left or right as viewed in FIG. 1 substantially parallel to the limit value line 67.

Also, the support means or longtitudinal carriage means 69 is provided with a longitudinal tongue member 73 which extends parallel to said abcissa direction of said Cartesian coordinate frame of reference, and, therefore, parallel to said limit value line 67 and which carries at the right end thereof the complete conversion means 21 including the stylus 24 and the counting and totalizing means 29, and which also carries the limit-value inactivating means 25 and the direction-of-change inactivating means 44.

In the exemplary but non-specifically-limiting form of the invention illustrated, said tongue means 73 also has a leftwardly extending portion 73L which is provided with counterbalancing weight means 74 which can be controllably adjustable either as to weight or as to effective lever arm relative to the axle 71, if desired, whereby to effectively substantially counterbalance the weight of the rightwardly extending tongue means 73 and the complete assembly of elements carried at the right end thereof as best shown in FIG. 2. Thus an operator grasping the control knob 68 will find that the tracking operation, comprising the following of the curve 22 by the stylus 24, can be very readily and easily effected since the moving structure will be substantially counterbalanced.

It should be noted that the right portion of the tongue means 73 is relatively long with respect to the maximum expected movement of the stylus 24 in the ordinate direction during the curve following or tracing operation, thus causing the movement of said stylus 24, and correspondingly of the rollable wheel means 26, on the surface of the chart 23 to be very nearly straight and parallel to the ordinate direction of said Cartesian coordinate frame of reference—that is, very nearly straight and perpendicular to the abcissa direction of said Cartesian coordinate frame of reference and/or said limit value line 67. This is substantially true for all practical purposes, since the effective radius of curvature is very great with respect to the very small arc of the stylus 24 and rollable wheel means 26 during such movement thereof.

It should be clearly noted that such movement of the stylus 24 and of the rollable wheel means 26 during a curve-tracing operation is permitted by rollable movement, in said transverse or abcissa direction, of the wheel means 72 carrying the support means or longitudinal carriage means 69.

It should be clearly noted that the frictional periphery 27 of the rollable wheel means 26 of the conversion means 21 is capable of moving in the abcissa direction with respect to the surface of the chart or graph 23 by reason of lateral relative sliding movement with respect thereto. This is also true of said frictional periphery 27 of the rollable wheel means 26 when the stylus means is moved in the non-output-signal producing direction, as indicated by the arrows 45. When this occurs, the rollable wheel means 26, as previously described, is firmly locked and prevented from rotation. Therefore, its point of contact with the surface of the chart 23 merely slips relative thereto until such time as the direction of movement of the stylus 24 is reversed so as to now be moving in the output-signal direction whereby to cause the overriding means comprising the frictional brake means 44 to be effectively released so as to allow free rotation of said rollable wheel means 26 in the direction of the arrow 46 shown in FIG. 3.

It should be noted that in the exemplary but non-specifically limiting form of the invention illustrated, the rightwardly extending longitudinal tongue means 73 includes a centrally positioned controllably engageable and disengageable fastening or coupling means 63. Said fastening or coupling means 63 is identical in construction to the other controllably disengageable fastening or coupling means 63' centrally positioned in the fence means 62 comprising the left fence member portion 62A and the right fence member portion 62B as best shown in FIG. 1. Each of these fastening or coupling means 63 and 63' is primarily for the purpose of allowing the corresponding longitudinal tongue member 73 and said fence means consisting of the portions 62A and 62B to be controllably disassembled when desired so as to enable the complete apparatus to be conveniently stored in a relatively small space in a very small and readily portable case. This is also facilitated by reason of the pivotal connection means 65 and various other disassembleable or position-adjustable features of the apparatus. Indeed, for this purpose it is desirable to provide means for controllably removing the counterbalancing weight means 74 from the leftwardly extending tongue portion 73L. It may merely rest thereon, or be controllably removably fastened with respect thereto by any suitable type of effective connection means, or the like.

While the type of fastening or coupling means shown at 63 and 63' in FIG. 1 and clearly illustrated in exploded relationship at 63 in FIG. 6 may be included for the disassembly and convenient storage purposes outlined above, or may be eliminated in other forms of the invention where this feature is not thought to be important, nevertheless, we will briefly describe the fastening or coupling means 63 which is also exemplary of the other one shown at 63'. As is best shown in FIG. 6 the left portion of the tongue member 73 has a rigidly attached extension member 74 lying at one side thereof and projecting forwardly of the end portion 75 of said left portion of said tongue member 73. Also, said left portion of said tongue member 73 has a receiving recess 76 in the end thereof. Said right portion of said tongue member 73 is provided with a projection element 77 which is adapted to be fitted into said receiving recess 76 when said right tongue portion 73 is moved from the solid line exploded position shown in FIG. 6 into the phantom line position aligned with, and in end-to-end abutment with, said left tongue portion 73. When this occurs, the forwardly or rightwardly extending end of said extension member 74 lies in closely laterally adjacent relationship with respect to said right tongue member portion 73 and acts as an effective rigid bridge across the end-to-end junction of said left and right tongue member portions 73 and is controllably disengageably fastened in said rigid bridging engagement therewith by fastening screw means 78 which is adapted to be extended through an aperture 79 and threaded into an interiorly threaded aperture 81 in said right portion of said tongue member 73, thus rigidly fastening the entire coupling means 63 together in the relationship clearly shown in FIG. 1. This is also true of the other similar coupling means 63' shown in FIG. 1.

It should be understood that the figures and the specific description thereof set forth in the application are for the purpose of illustrating the present invention and are not to be construed as limiting the present invention to the precise and detailed specific structure shown in the figures and specifically described hereinbefore. Rather, the real invention is intended to include substantially equivalent constructions embodying the integration of the product of the two quantities consisting of (one) a non-negative unidirectional movement which, in the symbols of differential calculus, can be expressed as $uds$ where $u$ is either zero or unity, and (two) some factor, $v$ which is a function of $s$. Essential parts of the construction necessary to obtain the factor, $v$, include a fixed fence, a plurality of wheels in contact with a drafting board or panel surface, or both.

The above, of course, refers to the form of the apparatus primarily employed in the analyzing of random load records where the unidirectional distance measurement of the load record, when in excess of a preselected limit value as determined by said fence, is to be accomplished. However, more broadly speaking, the invention may be said to comprise a type of random load record analyzer and/or unidirectional distance measuring device, where the limit value feature and, therefore, the fixed fence and cooperating means are eliminated entirely. Also, even more broadly speaking, the invention can be said to comprise apparatus for unidirectionally measuring changes of a variable function in one sense and this applies even when the variable function is not necessarily recorded in the form of a physical curve on a graph or chart and adapted to be mechanically followed by a stylus or the like, but may comprise a variety of different types of variable functions in any suitable form and means for unidirectionally measuring and/or integrating changes of said function in a particular desired sense—all within the broad scope and teachings of the present invention as set forth hereinbefore in one exemplary but non-specifically limiting form.

We claim:

1. Apparatus for unidirectionally integrating changes of a variable function in one output-signal-producing sense when said variable function has a value in excess of a preselected limit value, comprising: conversion means for effectively following and converting said changes of said variable function in said output-signal-producing sense when the value of said variable function is in excess of said preselected value into a perceptible output signal of a corresponding value, said conversion means including direction-of-change inactivating means cooperable therewith to effectively inactivate same insofar as the production of said output signal is concerned when said conversion means follows said variable function in a non-output-signal-producing sense opposite to said output-signal-producing sense, said conversion means also including limit value inactivating means cooperable therewith to effectively inactivate same insofar as the production of said output signal is concerned when said conversion means attempts to follow said variable function in said output-signal-producing sense when the value of said variable function is less than said preselected limit value thereof, said conversion means comprising stylus means cooperable to positionally follow and trace at least part of a physical curve corresponding to, and comprising the analog of, said variable function and further comprising rollable wheel means cooperable for rolling engagement with an underlying surface bearing said physical curve and effectively provided with, and coupled with respect to, counting and totalizing means adapted to effectively count and totalize the actual movement of said stylus means in said output-signal-producing sense along said physical curve, said physical curve corresponding to, and comprising the analog of, said variable function effectively comprising a graph positioned with respect to an imaginary Cartesian coordinate frame of reference, with said output-signal-producing sense comprising a physical direction corresponding to an ordinate direction thereof and lying in a perpendicular direction with respect to an abcissa direction thereof; said direction-of-change inactivating means comprising effective one-way movement overriding means effectively connected with respect to said rollable wheel means of said counting and totalizing means for effectively overriding the counting and totalizing operation thereof during the movement of said stylus means along said physical curve in said non-output-signal-producing direction, said one-way movement overriding means comprising effective unidirectional frictional brake means positioned adjacent to said rollable wheel means and cooperable therewith in a manner allowing free rotation thereof when said stylus means follows said physical curve in said output-signal-producing direction, but being frictionally unidirectionally cooperable with said rollable wheel means for effective braking and rotative immobilization thereof in response to movement of said stylus means in the opposite non-output-signal-producing direction thereof along said physical curve.

2. Apparatus as defined in claim 1, wherein said counting and totalizing means is provided with visibly observable scale and indicia means visibly indicating the total distance of the unidirectionally integrated positional movement changes of said stylus means along said physical curve in said output-signal-producing direction, when the value thereof exceeds said preselected limit value.

3. Apparatus as defined in claim 1, wherein said limit value inactivating means comprises fence means cooperable to be physically mounted in a predetermined relationship with respect to a limit value line extending in the abcissa direction of said physical curve and displaced therefrom in the ordinate direction, and further comprises controllably adjustable stop means effectively connected with respect to said stylus means for free relative movement with respect to said fence means in said output-signal-producing direction of movement of said stylus means but positioned for stopping abutment with respect to said fence means when said stylus means follows said physical curve from a value thereof in excess of said limit value to a value thereof equal to said limit value.

4. Apparatus as defined in claim 1, wherein said limit value inactivating means comprises fence means cooperable to be physically mounted in a predetermined relationship with respect to a limit value line extending in the abcissa direction of said physical curve and displaced therefrom in the ordinate direction, and further comprises controllably adjustable stop means effectively connected with respect to said stylus means for free relative movement with respect to said fence means in said output-signal-producing direction of movement of said stylus means but positioned for stopping abutment with respect to said fence means when said stylus means follows said physical curve from a value thereof in excess of said limit value to a value thereof equal to said limit value, said fence means including a pair of normally aligned fence member portions and connection means adjustably connected thereto adjacent to opposite ends thereof, said connection means being provided with connection clamp means spaced from said fence means substantially in said ordinate direction and cooperable for attachment with respect to an underlying supporting panel adapted to carry a chart bearing said physical curve thereon.

5. Apparatus as defined in claim 1, including support means mounting said stylus means, said rollable wheel means, and said counting and totalizing means associated therewith for rollable movement with respect to a chart bearing said physical curve substantially in said ordinate direction substantially at right angles with respect to said abcissa direction of said imaginary Cartesian coordinate frame of reference along which said physical curve extends in a length direction.

6. Apparatus as defined in claim 1, including support means mounting said stylus means, said rollable wheel means, and said counting and totalizing means associated therewith for rollable movement with respect to a chart bearing said physical curve substantially in said ordinate direction substantially at right angles with respect to said abcissa direction of said imaginary Cartesian coordinate frame of reference along which said physical curve extends in a length direction, said support means comprising longitudinal carriage means provided with axle means and lateral-movement wheel means laterally rollably carrying same, said axle means normally lying substantially parallel to said ordinate direction of said Cartesian coordinate frame of reference and being provided with a longitudinal tongue means extending laterally in a direction substantially parallel to said abcissa direction of said Cartesian coordinate frame of reference and bearing at the end thereof remote from said axle and said lateral-movement wheel means said stylus means, said rollable wheel means, said counting and totalizing means, and each of said inactivating means.

7. Apparatus as defined in claim 1, including support means mounting said stylus means, said rollable wheel means, and said counting and totalizing means associated therewith for rollable movement with respect to a chart bearing said physical curve substantially in said ordinate direction substantially at right angles with respect to said abcissa direction of said imaginary Cartesian coordinate frame of reference along which said physical curve extends in a length direction, said support means comprising longitudinal carriage means provided with axle means and lateral-movement wheel means laterally rollably carrying same, said axle means normally lying substantially parallel to said ordinate direction of said Cartesian coordinate frame of reference and being provided with a longitudinal tongue means extending laterally in a direction substantially parallel to said abcissa direction of said Cartesian coordinate frame of reference and bearing at the end thereof remote from said axle and said lateral-movement wheel means said stylus means, said rollable wheel means, said counting and totalizing means, and each of said inactivating means, said longitudinal tongue means being provided with a counterbalancing extension portion extending beyond said axle means in a direction opposite to the remainder of said tongue means with respect to said axle means and being provided with counterbalancing weight means.

8. Apparatus for unidirectionally integrating or summing the product of each change of a variable function in one output-signal-producing sense and a factor having a predetermined relationship with said variable function, comprising: a stylus means cooperable to positionally follow and trace a physical curve corresponding to said variable function, rollable wheel means cooperable for rolling engagement with an underlying surface bearing said physical curve, visibly observable scale and indicia means, sensing and transmitting means to convert said variable function into said factor, said factor having a predetermined relationship with said variable function, direction-of-change inactivating means comprising effective one-way movement overriding means effectively connected with respect to said rollable wheel means of said counting and totalizing means for effectively overriding the counting and totalizing operation thereof during the movement of said stylus means along said physical curve in said non-output-signal-producing direction, said one-way movement overriding means comprising effective unidirectional frictional brake means positioned adjacent to said rollable wheel means and cooperable therewith in a manner allowing free rotation thereof when said stylus means follows said physical curve in said output-signal-producing sense, but being frictionally unidirectionally cooperable with said rollable wheel means for effective braking and rotative immobilization thereof in response to movement of said stylus means in the opposite non-output-signal-producing direction thereof along said physical curve, and computing and totalizing means to produce a rate of change on said scale and indicia means which is equal to the product of the rate of movement of said stylus means along one direction and said factor, said predetermined relationship being one which renders said apparatus useful in evaluating the fatigue damage done to a particular material by a loading schedule described by said variable function.

9. Apparatus for unidirectionally measuring changes of a variable function in one output-producing sense comprising conversion means for effectively following and converting said changes of said variable function in said one output-producing sense into a perceptible output of a corresponding value, said conversion means comprising a function follower means cooperable to follow said variable function and include rollable wheel means effectively provided with, and coupled with respect to, output-producing means and also including direction-of-change inactivating means cooperable therewith to effectively inactivate same insofar as the production of said perceptible output is concerned when said conversion means follows said variable function in a non-output-producing sense opposite to said one-output-producing sense, said direction-of-change inactivating means comprising effective one-way movement overriding means effectively connected with respect to said rollable wheel means for effectively overriding the output-producing operation thereof during the function-following operation of said function follower means in correspondence with said variable function in a non-output-producing sense opposite to said output-producing sense, said one-way movement overriding means comprising effective unidirectional frictional brake means positioned adjacent to said rollable wheel means and cooperable therewith in a manner allowing free rotation thereof when said function follower follows said variable function in said output-producing sense, but being frictionally unidirectionally cooperable with said rollable wheel means for effective braking and rotative immobilization thereof in response to function-following operation of said function follower means in said opposite non-output-producing sense in correspondence with the value of said variable function.

10. Apparatus for unidirectionally integrating changes of a variable function in one output-signal-producing sense when said variable function has a value in excess of a preselected limit value, comprising: conversion means for effectively following and converting said changes of said variable function in said output-signal-producing sense when the value of said variable function is in excess of said preselected value into a perceptible output signal of a corresponding value, said conversion means including direction-of-change inactivating means cooperable therewith to effectively inactivate same insofar as the production of said output signal is concerned when said conversion means follows said variable function in a non-output-signal-producing sense opposite to said output-signal-producing sense, said conversion means also including limit value inactivating means cooperable therewith to effectively inactivate same insofar as the production of said output signal is concerned when said conversion means attempts to follow said variable function in said output-signal-producing sense when the value of said variable function is less than said preselected limit value thereof, said conversion means comprising stylus means cooperable to positionally follow and trace at least part of a physical curve corresponding to, and comprising the analog of, said variable function and further comprising rollable wheel means cooperable for rolling engagement with an underlying surface bearing said physical curve and effectively provided with, and coupled with respect to, counting and totalizing means adapted to effectively count and totalize the actual movement of said stylus means in said output-signal-producing sense along said physical curve, said physical curve corresponding to, and comprising the analog, of, said variable function effectively comprising a graph positioned with respect to an imaginary Cartesian coordinate frame of reference, with said output-signal-producing sense comprising a physical direction corresponding to an ordinate direction thereof and lying in a perpendicular direction with respect to an abcissa direction thereof: said limiting value inactivating means comprising fence means cooperable to be physically mounted in a predetermined relationship with respect to a limit value line extending in the abcissa direction of said physical curve and displaced therefrom in the ordinate direction, and further comprising controllably adjustable stop means effectively connected with respect to said stylus means for free relative movement with respect to said fence means in said output-signal-producing direction of movement of said stylus means but positioned for stopping abutment with respect to said fence means when said stylus means follows said physical curve from a value thereof in excess of said limit value to a value thereof equal to said limit value, said fence means including a pair of normally aligned fence member portions and connection means adjustably connected thereto adjacent to opposite ends thereof, said connection means being provided with connection clamp means spaced from said fence means substantially in said ordinate direction and cooperable for attachment with respect to an underlying supporting panel adapted to carry a chart bearing said physical curve thereon.

11. Apparatus for unidirectionally integrating changes of a variable function in one output-signal-producing sense when said variable function has a value in excess of a preselected limit value, comprising: conversion means for effectively following and converting said changes of said variable function in said output-signal-producing sense when the value of said variable function is in excess of said preselected value into a perceptible output signal of a corresponding value, said conversion means including direction-of-change inactivating means cooperable therewith to effectively inactivate same insofar as the production of said output signal is concerned when said conversion means follows said variable function in a non-output-signal-producing sense opposite to said output-signal-producing sense, said conversion means also including limit value inactivating means cooperable therewith to effectively inactivate same insofar as the production of said output signal is concerned when said conversion means attempts to follow said variable function in said output-signal-producing sense when the value of said variable function is less than said preselected limit value thereof, said conversion means comprising stylus means cooperable to positionally follow and trace at least part of a physical curve corresponding to, and comprising the analog of, said variable function and further comprising rollable wheel means cooperable for rolling engagement with an underlying surface bearing said physical curve and effectively provided with, and coupled with respect to, counting and totalizing means adapted to effectively count and totalize the actual movement of said stylus means in said output-signal-producing sense along said physical curve, said physical curve corresponding to, and comprising the analog, of, said variable function effectively comprising a graph positioned with respect to an imaginary Cartesian coordinate frame of reference, with said output-signal-producing sense comprising a physical direction corresponding to an ordinate direction thereof and lying in a perpendicular direction with respect to an abcissa direction thereof; and support means mounting said stylus means, said rollable wheel means, and said counting and totalizing means associated therewith for rollable movement with respect to a chart bearing said physical curve substantially in said ordinate direction substantially at right angles with respect to said abcissa direcion of said imaginary Cartesian coordinate frame of reference along which said physical curve extends in a length direction, said support means comprising longitudinal carriage means provided with axle means and lateral-movement wheel means laterally rollably carrying same, said axle means normally lying substantially parallel to said ordinate direction of said Cartesian coordinate frame of reference and being provided with a longitudinal tongue means extending laterally in a direction substantially parallel to said abcissa direction of said Cartesian coordinate frame of reference and bearing at the end thereof remote from said axle and said lateral-movement wheel means said stylus means, said rollable wheel means, said counting and totalizing means, and each of said inactivating means.

12. Apparatus for unidirectionally integrating changes of a variable function in one output-signal-producing sense when said variable function has a value in excess of a preselected limit value, comprising: conversion means for effectively following and converting said changes of said variable function in said output-signal-producing sense when the value of said variable function is in excess of said preselected value into a perceptible output signal of a corresponding value, said conversion means including direction-of-change inactivating means cooperable therewith to effectively inactivate same insofar as the production of said output signal is concerned when said conversion means follows said variable function in a non-output signal-producing sense opposite to said output-signal-producing sense, said conversion means also including limit value inactivating means cooperable therewith to effectively inactivate same insofar as the production of said output signal is concerned when said conversion means attempts to follow said variable function in said output-signal-producing sense when the value of said variable function is less than said preselected limit value thereof, said conversion means comprising stylus means cooperable to positionally follow and trace at least part of a physical curve corresponding to, and comprising the analog of, said variable function and further comprising rollable wheel means cooperable for rolling engagement with an underlying surface bearing said physical curve and effectively provided with, and coupled with respect to, counting and totalizing means adapted to effectively count and totalize the actual movement of said stylus means in said output-signal-producing sense along said physical curve, said physical curve corresponding to, and comprising the analog of, said variable function effectively comprising a graph positioned with respect to an imaginary Cartesian coordinate frame of reference, with said output-signal-producing sense comprising a physical direction corresponding to an ordinate direction thereof and lying in a perpendicular direction with respect to an abcissa direction thereof; and support means mounting said stylus means, said rollable wheel means, and said counting and totalizing means associated therewith for rollable movment with respect to a chart bearing said physical curve substantially in said ordinate direction substantially at right angles with respect to said abcissa direction of said imaginary Cartesian coordinate frame of reference along which said physical curve extends in a length direction, said support means comprising longitudinal carriage means provided with axle means and lateral-movement wheel means laterally rollably carrying same, said axle means normally lying substantially parallel to said ordinate direction of said Cartesian coordinate frame of reference and being provided with a longitudinal tongue means extending laterally in a direction substantially parallel to said abcissa direction of said Cartesian coordinate frame of reference and bearing at the end thereof remote from said axle and said lateral-movement wheel means said stylus means, said rollable wheel means, said counting and totalizing means, and each of said inactivating means, said longitudinal tongue means being provided with a counterbalancing extension portion extending beyond said axle means in a direction opposite to the remainder of said tongue means with respect to said axle means and being provided with counterbalancing weight means.

References Cited by the Examiner

UNITED STATES PATENTS 1,376,768  5/1921  Hess _____ 33—121

FOREIGN PATENTS 348,215  1/1905  France.

ISAAC LISANN, *Primary Examiner.*